(12) United States Patent
O'Connor et al.

(10) Patent No.: US 8,904,166 B2
(45) Date of Patent: *Dec. 2, 2014

(54) SECURE CLIENT-SIDE COMMUNICATION BETWEEN MULTIPLE DOMAINS

(71) Applicant: salesforce.com, inc., San Francisco, CA (US)

(72) Inventors: Brendan O'Connor, San Francisco, CA (US); Yoel Gluck, San Francisco, CA (US)

(73) Assignee: salesforce.com inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,675

(22) Filed: Aug. 6, 2013

(65) Prior Publication Data

US 2013/0326210 A1 Dec. 5, 2013

Related U.S. Application Data (63) Continuation of application No. 13/065,868, filed on Mar. 30, 2010, now Pat. No. 8,539,234.

(60) Provisional application No. 61/319,188, filed on Mar. 30, 2010.

(51) Int. Cl.
| | |
|---|---|
| *H04L 29/06* | (2006.01) |
| *H04L 9/32* | (2006.01) |
| *G06F 7/04* | (2006.01) |
| *G06F 15/16* | (2006.01) |
| *G06F 9/00* | (2006.01) |

(52) U.S. Cl.
CPC ............ *H04L 63/0428* (2013.01); *H04L 63/08* (2013.01); *H04L 63/12* (2013.01); *H04L 9/3242* (2013.01); *H04L 2209/60* (2013.01); *H04L 2209/80* (2013.01)

USPC .................. 713/150; 713/168; 726/1; 726/8; 380/45; 790/202; 790/229

(58) Field of Classification Search
None
See application file for complete search history.

(56) References Cited

U.S. PATENT DOCUMENTS 4,227,253 A * 10/1980 Ehrsam et al. ................ 380/45
5,577,188 A 11/1996 Zhu (Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Shin-Hon Chen
(74) *Attorney, Agent, or Firm* — Weaver Austin Villeneuve & Sampson (57) ABSTRACT

Methods and systems for secure client-side communication between multiple domains is provided. Such methods and systems can provide for decreased communication latency particularly effective for dynamic multi-domain and/or multi-tenant environments while allowing for granular security or specific security of messages and operations with regard to users, user sessions, groups, organizations, permissions sets, applications, or any other logical delineation. Such methods and systems may involve a variety of security components, for example, at least one set of instructions including a plurality of defined instruction to be utilized by users of the set of instructions to communicate, and cryptographic construct data in order to verify the data integrity and the authenticity of messages sent and received using the secure client-side communication between multiple domains.

21 Claims, 8 Drawing Sheets

(56) References Cited

U.S. PATENT DOCUMENTS

| | | |
|---|---|---|
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,421,686 B1 * | 7/2002 | Martin, Jr. ............. 1/1 |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,611 B2 | 1/2012 | Tuzhilin et al. |
| 8,117,325 B1 * | 2/2012 | Wu ............................ 709/229 |
| 8,150,913 B2 | 4/2012 | Cheah |
| 8,209,333 B2 | 6/2012 | Hubbard et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0023880 A1 * | 1/2003 | Edwards et al. ............... 713/201 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0299857 A1 * | 12/2007 | Gwozdz et al. ............... 707/102 |
| 2008/0072301 A1 * | 3/2008 | Chia et al. ............... 726/8 |
| 2009/0063415 A1 | 3/2009 | Chatfield et al. |
| 2010/0049782 A1 * | 2/2010 | Li ............................ 709/202 |
| 2012/0290407 A1 | 11/2012 | Hubbard et al. |

OTHER PUBLICATIONS

US Office Action for U.S. Appl. No. 13/065,868, dated Jan. 3, 2013.
US Notice of Allowance for U.S. Appl. No. 13/065,868, dated May 7, 2013.

* cited by examiner

SECURE CLIENT-SIDE COMMUNICATION BETWEEN MULTIPLE DOMAINS

CROSS-REFERENCES TO RELATED APPLICATIONS

This application is a continuation of, and claims priority to, pending U.S. patent application Ser. No. 13/065,868, filed Mar. 30, 2010, which claims benefit of priority to U.S. Provisional Application 61/319,188, filed Mar. 30, 2010, both of which are hereby incorporated by reference herein in their entireties for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many embodiments described herein generally relate to secure communications and more particularly to secure client-side communication between multiple domains. These methods and systems can be particularly effective in a dynamic multi-domain and/or multi-tenant environment.

Because of Same Origin Policy security measure in web browser programming, content provided from each domain and subdomains cannot be communicated directly between other domains and subdomains on the client-side respectively. Currently, this policy causes domains in a dynamic multi-domain environment to communicate through a server rather than a direct communication. Although Same Origin Policy provides security control desired for dynamic multi-domain and/or multi-tenant environments, it introduces latency within these environments.

Currently, some newer technologies allow for cross-domain or cross-sandbox communication, for example, Adobe Flash. These technologies however mostly use proprietary standards and implementation which does not blend well in dynamic multi-domain and/or multi-tenant environments. Another example of these newer technologies recently developed is Cross-Origin Resource Sharing (CORS) for direct communication of content from different domains under Same Origin Policy. However, CORS is only supported by modern web browsers and lacks support for legacy browsers. Further, these existing technologies and methods for limited cross-domain or cross-sandbox communication are, at most, applied to the scope of a domain or domain path and offer limited granular security controls and permissions.

Accordingly, it is desirable to develop methods and systems that provide for decreased communication latency, particularly for dynamic multi-domain and/or multi-tenant environments while allowing for granular security or specific security of messages and operations with regard to users, user sessions, groups, organizations, permissions sets, applications, or any other logical delineation.

BRIEF SUMMARY

The following presents a simplified summary of some embodiments in order to provide a basic understanding. This is not intended to identify key/critical elements or to delineate the scope of the embodiments. Its sole purpose is to present some aspects and embodiments in a simplified form as a prelude to the more detailed description that is presented later.

Methods and systems for secure client-side communication between multiple domains is provided. Such methods and systems can provide for decreased communication latency, particularly effective for dynamic multi-domain and/or multi-tenant environments while allowing for granular security or specific security of messages and operations with regard to users, user sessions, groups, organizations, permissions sets, applications, or any other logical delineation. Such methods and systems may involve a variety of security components, for example, at least one set of instructions including a plurality of defined instructions to be utilized by users of the set of instructions to communicate, and cryptographic construct data in order to verify the data integrity and the authenticity of messages sent and received using the secure client-side communication between multiple domains.

In many embodiments, a method for secure client-side communication is provided. The method typically includes receiving authentication information of a user for a first domain and a second domain from a client, and authenticating an identity of the user based at least in part upon the authentication information, and generating a set of instructions for client-side communication between the first domain and the second domain in response to a request received from the client, and generating cryptographic construct data for each set of instructions, and sending the set of instructions and the cryptographic construct data to the client.

In some embodiments, a method for secure client-side communication is provided. The method typically includes providing authentication information of a user for a first domain and a second domain, and receiving a set of instructions and a cryptographic construct data, the set of instructions including one or more operations mapped to at least one instruction ID, and identifying a first instruction ID corresponding to first set of operations, and generating a first message using the cryptographic construct data, and sending the message to a recipient.

In certain embodiments, a method for secure client-side communication is provided. The method typically includes detecting a second message, and validating the second message using the cryptographic construct data, and identifying a second set of operations corresponding to a second instruction ID, and performing the second set of operations Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Various embodiments provide novel tools for secure communication between multiple secure entities, such as software applications with particular security restriction requirements. In embodiments, these novel tools are provided for secure client-side communication between multiple domains, sub-domains, and a combination thereof. In some embodiments, the secure client-side communication may be between sub-domains of a particular domain. In certain embodiments, the software applications may include mini applications (e.g, gadgets and/or applets). In some embodiments, the software applications may include web applications. In certain aspects, the secure communication is enabled using one or more interfaces, such as API or network communication. In certain embodiments, the secure communication between multiple secure entities includes a one way communication.

Systems and methods in accordance with many embodiments of the present disclosure can overcome one or more of the aforementioned and other deficiencies in existing secure client-side communication between multiple domains and subdomains. Many embodiments can provide for improved communication latency as well as the ability to be implemented in any new or legacy web browser, web-enabled clients, and client-side technology. Such systems and methods allow for granular security or specific security of messages and operations in dynamic multi-domain and/or multi-tenant environments.

System Overview

Figure 1:
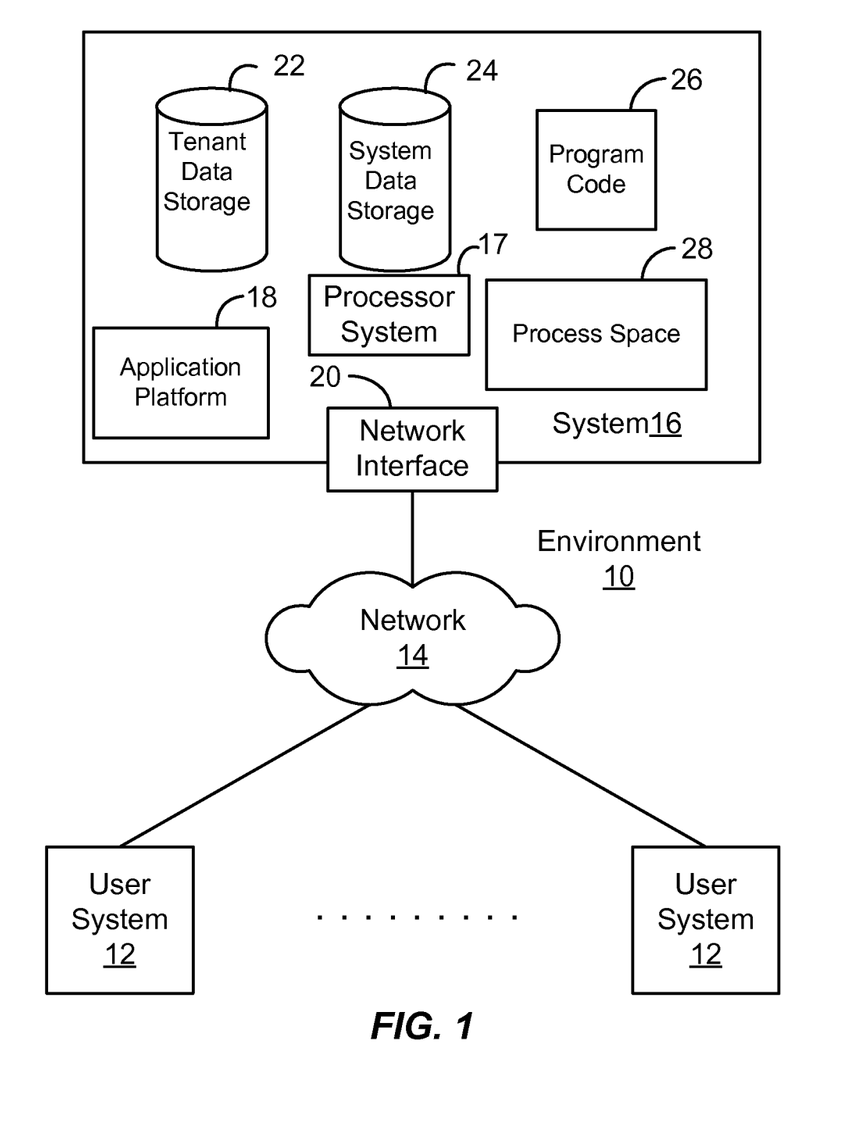
FIG. 1 illustrates a block diagram of an environment wherein an on-demand database service might be used, in accordance with many embodiments.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
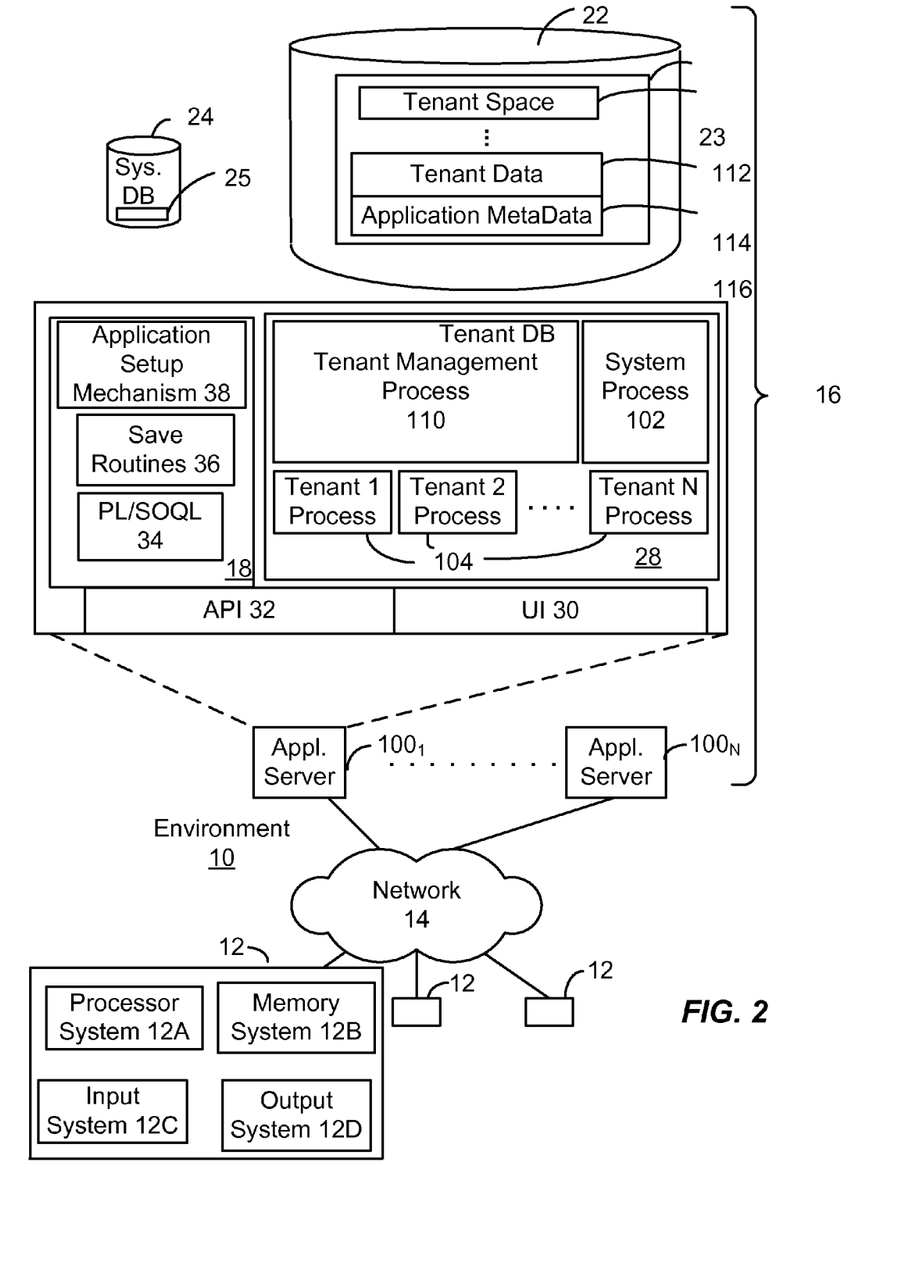
FIG. 2 illustrates a block diagram of an embodiment of elements of FIG. 1 and various possible interconnections between these elements according to an embodiment of the present invention, in accordance with many embodiments.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. Yet another table or object might describe an Opportunity, including fields such as organization, period, forecast type, user, territory, etc.

In some multi-tenant database systems, tenants may be allowed to create and store custom objects, or they may be allowed to customize standard entities or objects, for example by creating custom fields for standard objects, including custom index fields. U.S. Pat. No. 7,779,039, issued on Aug. 17, 2010, entitled "Custom Entities and Fields in a Multi-Tenant Database System", and which is hereby incorporated herein by reference, teaches systems and methods for creating custom objects as well as customizing standard objects in a multi-tenant database system.

Secure Communications

As mentioned above, in certain embodiments user system 12 accesses, processes and views information, pages and applications available to it from system 16 over network 14 through an HTTP client, e.g., a browsing program, such as Microsoft's Internet Explorer browser, Netscape's Navigator browser, Opera's browser, or a WAP-enabled browser in the case of a cell phone, PDA or other wireless device, or the like.

Figure 3:
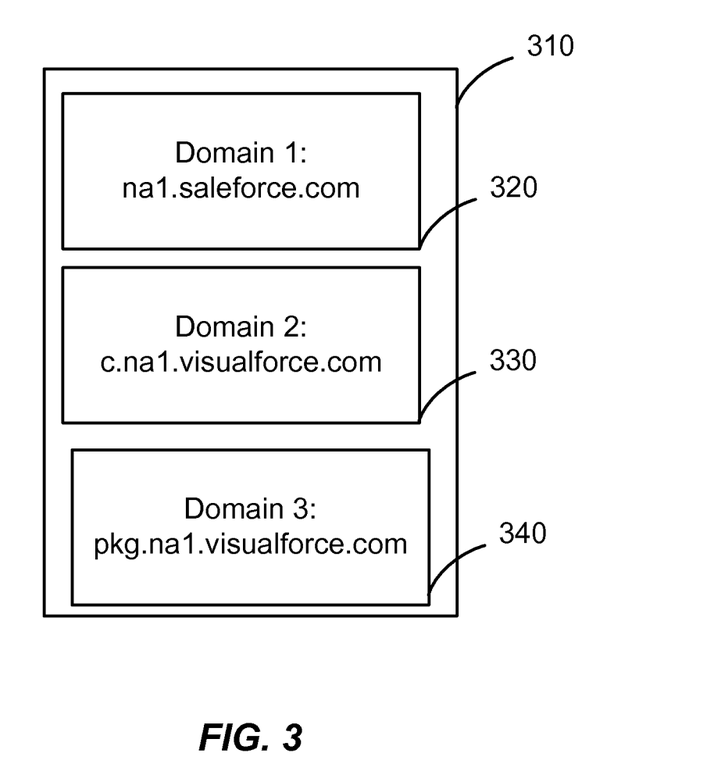
FIG. 3 illustrates an example of what may be shown in a browser window, in accordance with many embodiments.

In certain embodiments, communicating software applications may provide content to other communication parties using a user interface object, such as a window. In some embodiments, server 16 may be able to provide content from multiple domains to be loaded and displayed within a single browser window. In the example shown in FIG. 3, browser window 310 may include three separate frames. It should be understood that the number of frames that browser 310 might display may be different. Each browser frame may provide content from a different domain. For example, top frame 320 provides content from na1.salesforce.com, middle frame 330 provides content from c.na1.visual.force.com, and bottom frame 340 provides content from pkg.na1.visual.force.com. In this example, top frame 320 displays a custom page from salesforce.com, middle frame 330 displays a custom Visual-Force page, and bottom frame 340 displays a custom third-party application from Force.com. In certain embodiments, the content of each window or frame may be any combination of javascript, HTML content, or client-side code or technology such as an Adobe Flash file or Java Applet.

Figure 4:
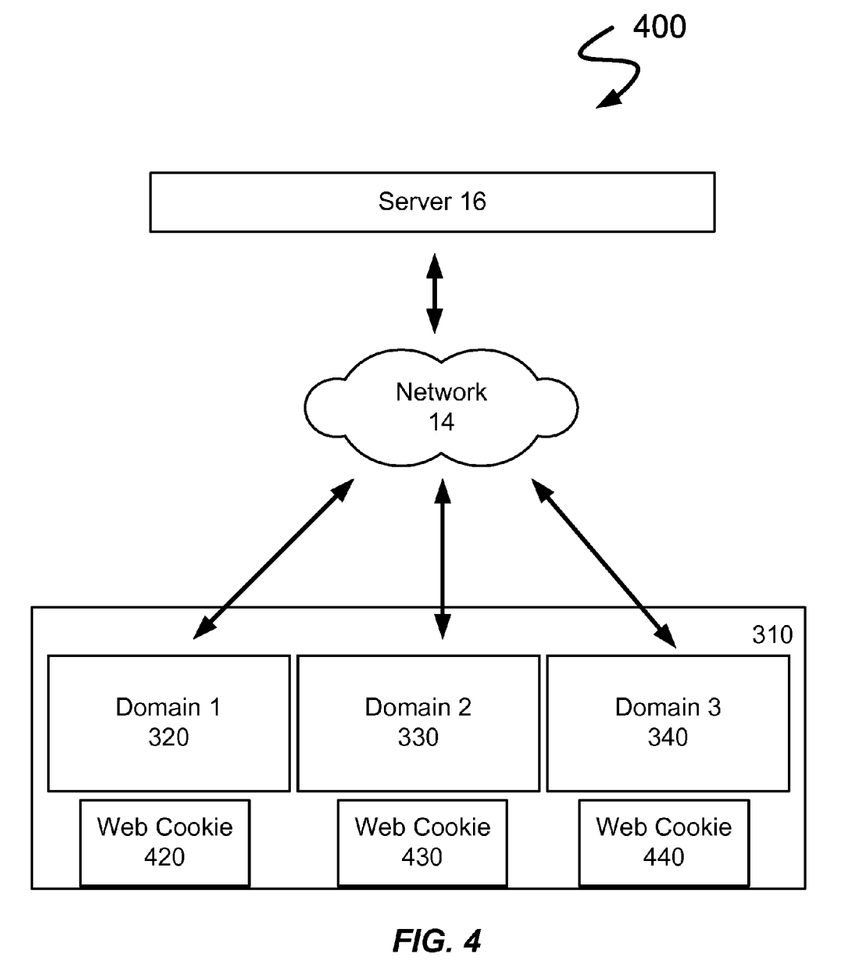
FIG. 4 illustrates a communication architecture, in accordance with many embodiments.

As shown in FIG. 4, communication session 410 is established between server 16 and each frame 320, 330, and 330 respectively, in accordance with some embodiments. Each session is generally identified by a secure session ID, unique random token, or any other type of authenticator. In some embodiments, each Session ID is a globally unique identifier allowing a server to identify a user and the user context for each session ID. Each session ID is typically generated and sent from the server to be saved as web cookie 420, 430, and 440 for each frame 320, 330, and 340 respectively. Each cookie may consist of one or more name-value pairs containing bits of information, which may be encrypted for information privacy and data security purposes.

As shown in FIG. 4, server 16 for the respective browser frames have generated and sent web cookies 420, 430, and 440 to each client in order to determine the identity of each user and their information access level within server 16, in accordance with some embodiments. Therefore, each browser frame may securely communicate with its respective server(s), but browser frames can not securely communicate with one another.

In order to provide secure client-side communication, specific communication policies may be generated and enforced by a trusted entity, for example, operating systems, frameworks, or software applications, such as client browser, or the like. In secure client-side communication between browser frames, as shown in FIG. 4, server 16 may generate and/or enforce specific communication policies set for each browser frame, in accordance with some embodiments. The communication policies can be implemented through generating a set of instruction allowing client-side communication between multiple domains by a server. In certain aspects, each instruction within the set of instructions may be included in the set based on the access level of each user and the operations the user can perform. For example, server 16 may add "Refresh Window" operation in an instruction set if it determines that a user can perform "Refresh Window" operation. In some embodiments, the generated set of instructions would act as metadata in cases that the client (e.g., web browser) has an existing set of instructions in place for their network communication.

Figure 5A:
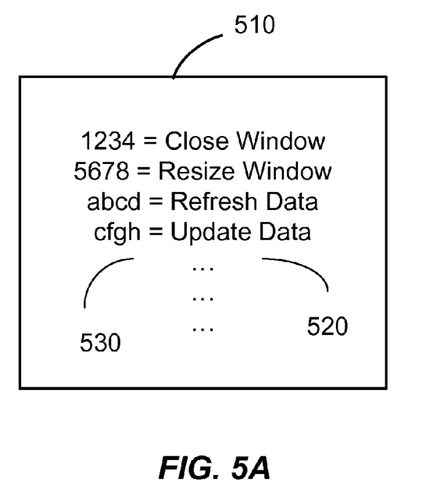
FIGS. 5A-5B illustrate an example of an instruction set and an HMAC (hash-based message authentication code), in accordance with many embodiments.

As shown in FIG. 5A, each operation 520 in set of instructions 510 generated by the server 16 can be mapped to an instruction ID 530. For example, "Close Window" operation can be associate with an instruction ID "1234." This allows for secure communication, dynamic configuration, and controlled assignment of operation for each communicating party. In some aspects, each set of instructions is unique globally. In certain embodiments, each instruction ID within each set of instructions is unique to the set of instructions it belongs. In certain aspects, each instruction ID includes one or more random number.

Each browser frame may use a set of instructions received from server 16 in order to participate in any client-side communication, in accordance with certain embodiments. This ensures a secure client-side communication by limiting the number of communicating parties based on policies enforced by server 16. For example, if a frame 320 receives an instruction ID "1234" without having set of instruction 510, the client would not be able to perform any instructions associated with the received instruction ID 530. In certain embodiments, each message sent using secure client-side communication may include necessary metadata unique to each instruction, such as windows size, data types, field references, etc.

In certain embodiments, set of instructions 510 may be modified by server 16, or a new set of instruction may replace the existing set of instructions during client-side communication allowing for dynamic configuration and greater flexibility in customization of the secure client-side communication governed by server 16. For example, a user context may change for a client during a communication session. Consequently, the server 16 may generate and send a new and/or modified set of instructions in response to the change of user context for each browser frame. In some embodiments, the browser frame may use the new and/or modified set of instructions upon receipt of the set of instructions.

In some embodiments, server 16 may exclude certain operations globally affecting all available set of instructions 510. For example, a "Delete" operation may not be implemented in any set of instructions 510 if server 16 has excluded "Delete" operation globally according to specific server security protocols.

Figure 5B:
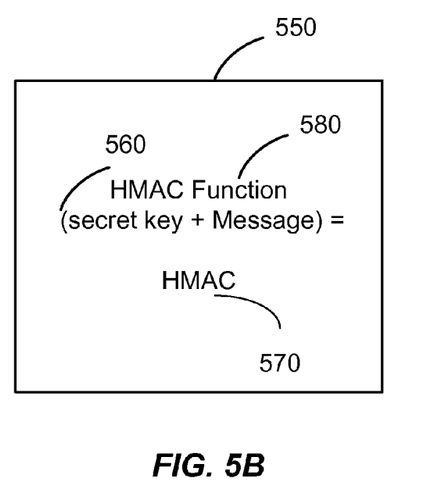

In certain aspects, server 16 may also generate cryptographic construct data in addition to generating one or more set of instructions 510 to be used in a secure client-side communication in order to ensure the authenticity of a message using, for example, digital signatures, message authentication codes (MACs), and other forms of authentication. As shown in FIG. 5B, a Hash-based Message Authentication Code (HMAC) is a cryptographic construct that is used to validate the authenticity and integrity of data during secure client-side communication between multiple domains, in accordance with certain embodiments. In some aspects, HMAC cryptographic construct data may include secret key 560 and HMAC function 580. Secret key 560 may be unique to a set of instructions and may be shared between the set of instructions users. The Secret Key may be sent along with cryptographic metadata to be used with the secret key to generate an authentication token. In certain aspects, HMAC function 580 would receive a message to be encrypted along with the secret key 560 and generate an authentication token 570. In some embodiments, HMAC function 580 may use different HMAC algorithms to generate authentication token 570.

Figure 6:
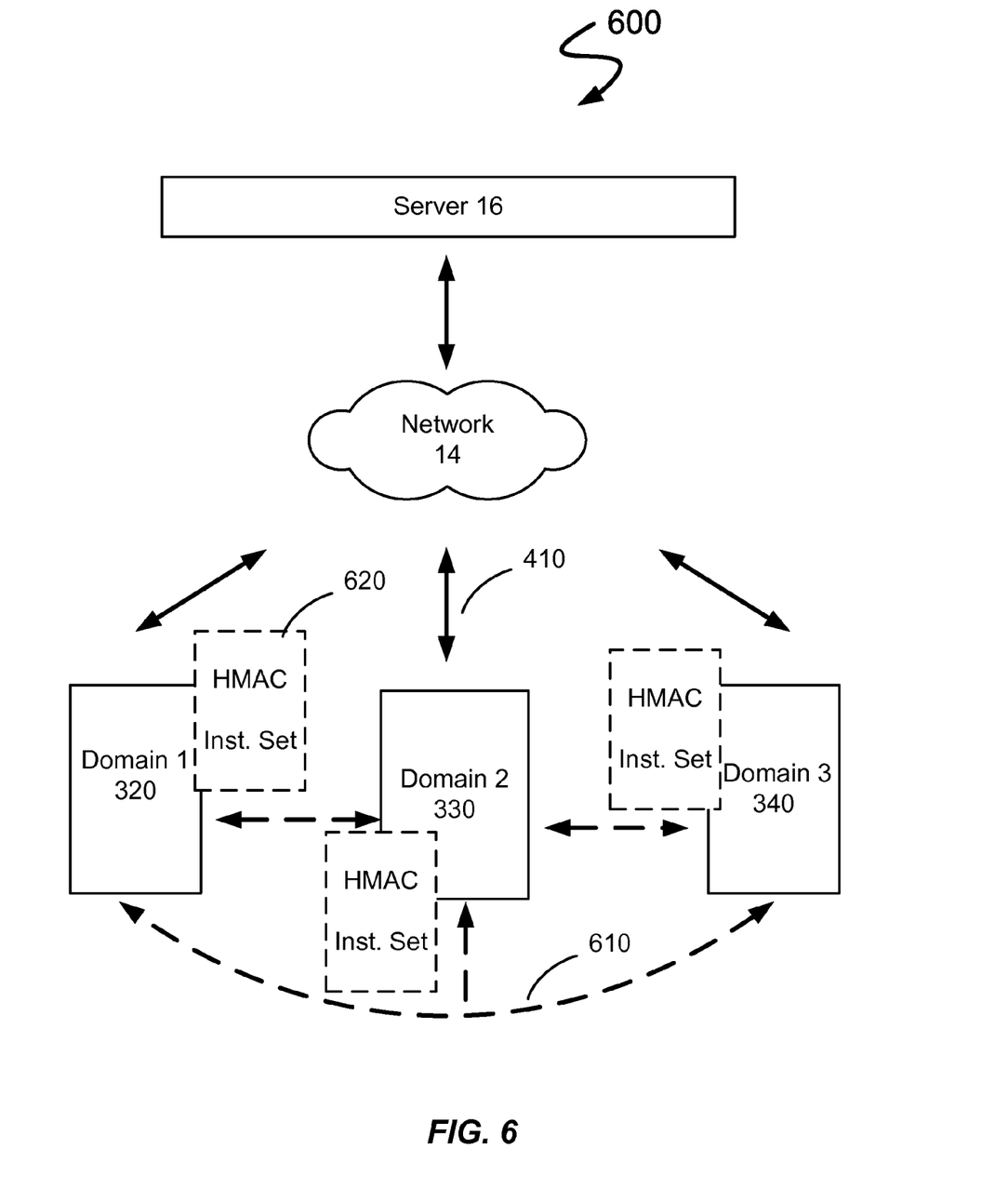
FIG. 6 illustrates a communication architecture, in accordance with many embodiments.

As shown in FIG. 6, a communication session 410 is established between server 16 and each frame 320, 330, and 340 respectively, in accordance with some embodiments. Server 16 then may send the generated instruction set 510 and cryptographic construct data to each browser frame, in accordance with some embodiments. Therefore, each browser frame may securely establish communication session 610 with other available browser frames from other domains as shown using HMAC cryptographic construct data and set of instructions 620 available to each browser frame. For example, frame 340 belonging to Domain D3 may now call frame 320 belonging to Domain D1 passing an instruction ID 520 along with any necessary metadata associated with instruction ID 520 using the cryptographic construct data for that request. When the receiving frame 320 running in Domain D1 detects a message, it validates the HMAC of the message and any accompanying security instructions or metadata and then translates the instruction ID to its corresponding operation so that the operation can be performed. By using the shared instruction sets and validating HMACs for corresponding requests, windows, content, and other data or code with a session context from the individual domains may now securely communicate with one another as shown in FIG. 6.

Figure 7:
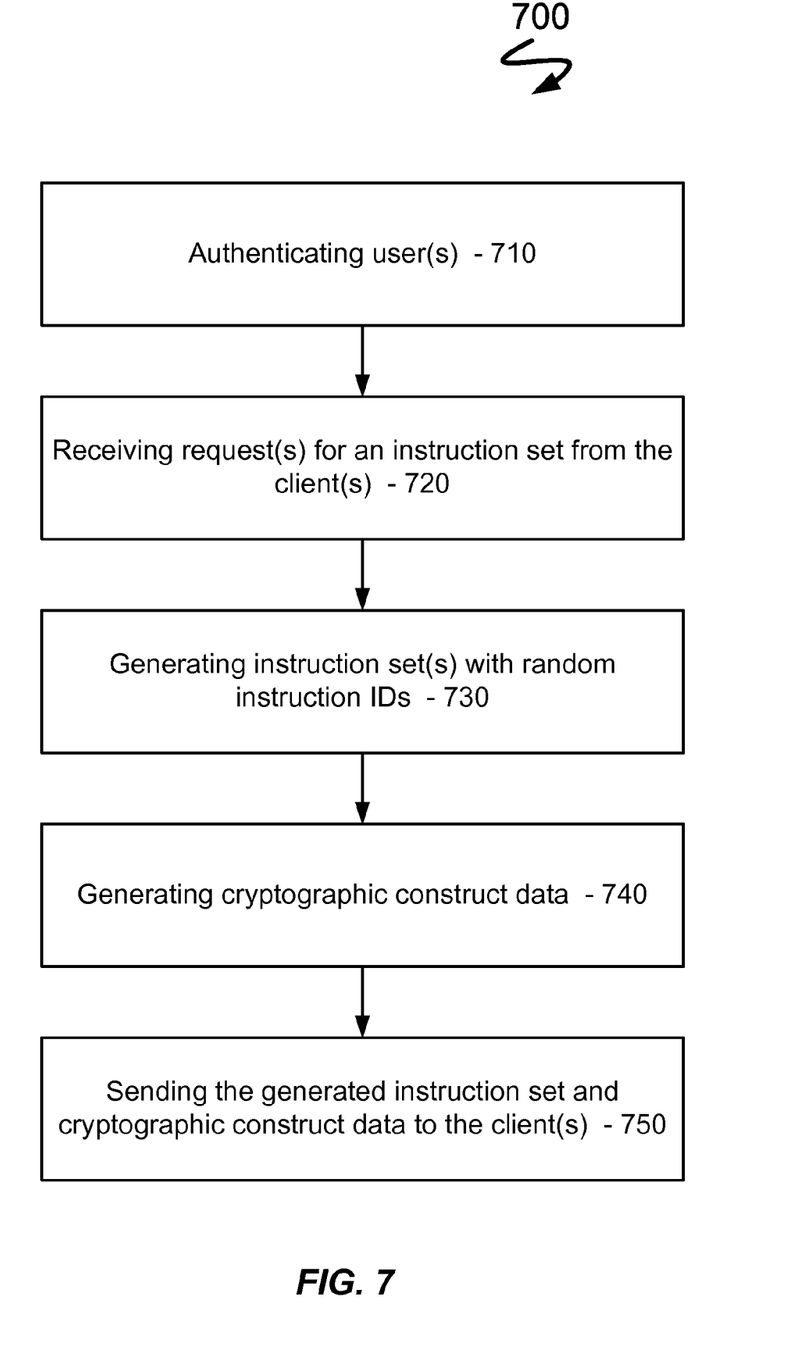
FIG. 7 illustrates a flow diagram of preparation for method of secure client-side communication between multiple domains, in accordance with many embodiments.

FIG. 7 illustrates a flow chart of method 700 for preparing a secure client-side communication between multiple domains, in accordance with many embodiments. It should be appreciated that the steps illustrated in FIG. 7 are not necessarily performed in the example sequence and may be performed concurrently or in a different order according to certain embodiments. In step 710, one or more users are authenticated by a trusted entity. In certain aspects, user(s) from a client system(s) may be authenticated to other client system(s). In some embodiments, user(s) are authenticated to a plurality of domains (e.g., frames 320, 330, and 340 as discussed above at least with reference to FIG. 3). In many embodiments, a user can be authenticated to a domain by providing credentials for logging in to a web application. In certain embodiments, multiple users may be authenticated to the plurality of domains from a client system(s). In certain embodiments, multiple users may be authenticated to the plurality of domains from different client system(s).

In step 720, a request is sent from the client(s) to the server (e.g., server 16 as discussed above at least with reference to FIG. 2) requesting a set of instructions for secure client-side communication between multiple domains. In some embodiments, a request for an instruction set is sent to the server in response to initialization of a web application. In certain embodiments, the server may receive the request and determine the user context to determine what operations may be performed and what resources of the server may be accessed by the user.

In step 730, one or more instruction set(s) (e.g., instruction set 510 as discussed above at least with reference to FIG. 5) are generated for the user(s) based on the determination made by the server. In some embodiments, one or more operations may be mapped to a sufficiently long and unique instruction ID (e.g., instruction ID 530 as discussed above at least with reference to FIG. 5). In some embodiments, the instruction ID(s) may be generated randomly. In certain aspects, an instruction set may be sent to and shared between multiple instruction users based on generated communication policies. In certain aspects, the shared instruction set may include necessary metadata to define security privileges for each instruction user so that only privileged operations may be performed by each instruction user In certain aspects, set of instructions may contain a variety of metadata to increase security and extend functionality of each instruction within the sets of instructions, such as sender origin, operation timestamp, replay protections, or other security or integrity measures. In some embodiments, instruction IDs may be assigned a Time To Live (TTL) based on their security risk. A low-risk operation, such as "Re-size Window" operation, may have a long TTL such as 8 hours or longer. For higher risk operations, such as direct data manipulation, a much shorter TTL (e.g., 30 minutes or shorter) may be more appropriate. When an instruction within the set of instructions has reached its expiration time, the receiving client which interprets instructions will no longer be able to perform the corresponding operation for that instruction. In some embodiments, the code for each client utilizing the shared expired instructions will need to call back to the server for new instruction IDs or an entirely new set of instructions. By mandating expiration of high risk operations, the probability that a malicious third party may forge or guess an instruction is greatly reduced. Additionally, if the user context on one of the participating domains were to change (the user logged out, their account was disabled, their privilege level changed, etc.) they would not be able to receive a new instruction set.

In step 740, cryptographic construct data (e.g., cryptographic construct data 550 as discussed above at least with reference to FIG. 5) are generated for the user(s). In certain aspects, the cryptographic construct data may include a secret key and an HMAC function. Having the cryptographic construct data enables granular security controls and permissions. In some embodiments, the security key may be assigned a Time To Live (TTL). In certain embodiments, more than one secret key may be used for a set of instructions. In certain aspects, different HMAC functions or HMAC algorithm may be used for a set of instructions.

In step 750, the generated set(s) of instructions and cryptographic construct data are sent to the client(s). In certain aspects, one or more generated set(s) of instructions and cryptographic construct data are sent to each instruction user based on communication policies generated and enforced by the server.

Figure 8:
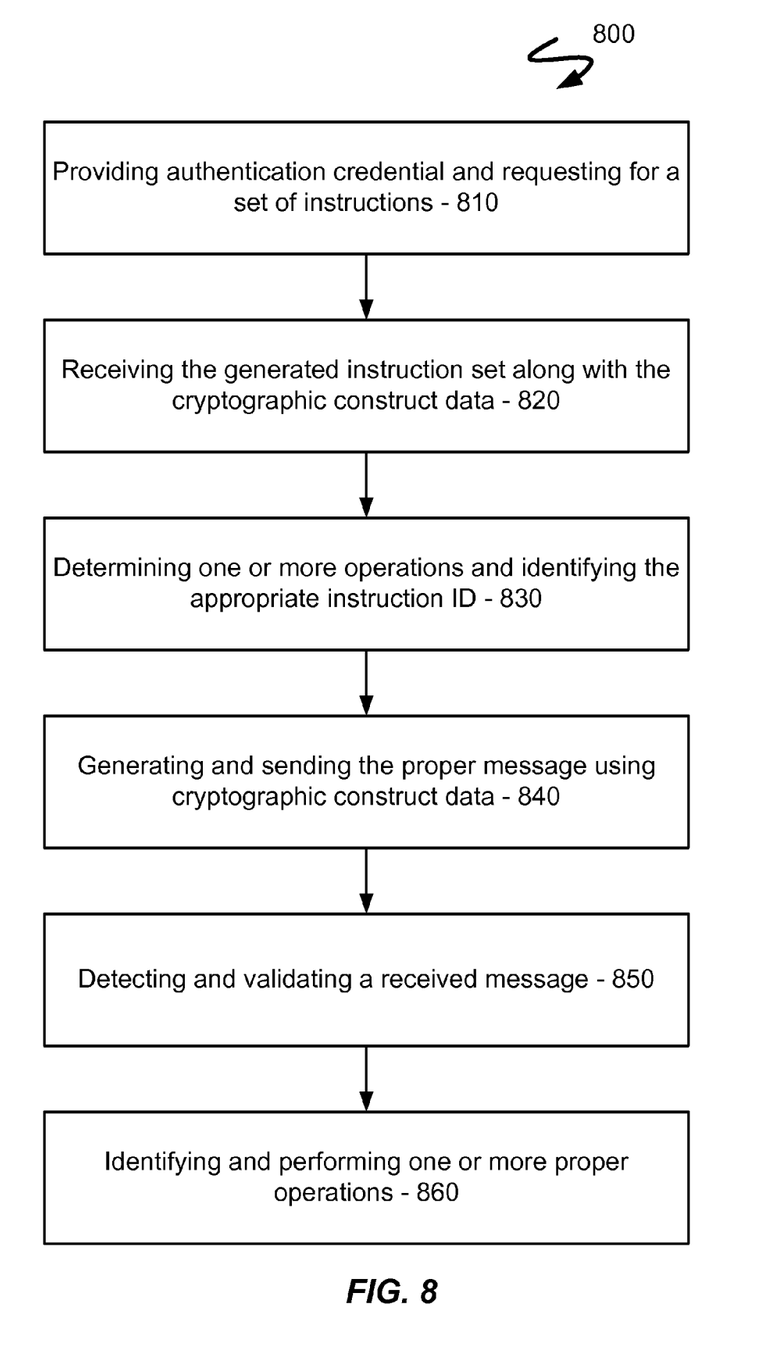
FIG. 8 illustrates a flow diagram for method of secure client-side communication between multiple domains, in accordance with many embodiments.

FIG. 8 illustrates a flow chart of method 800 for a secure client-side communication between multiple domains, in accordance with many embodiments. It should be appreciated that the steps illustrated in FIG. 8 are not necessarily performed in the example sequence and may be performed concurrently or in a different order according to certain embodiments. In step 810, one or more users are authenticated to a plurality of domains (e.g., frames 320, 330, and 340 as discussed above at least with reference to FIG. 3). In many embodiments, a user can be authenticated providing a username and password upon logging in to a web application. In step 820, the generated instruction set along with the cryptographic construct data is received. In certain embodiments, the received data corresponds to the determined user context. In certain aspects, additional data may be received in response to a change in the corresponding user context. In step 830, one or more operations (e.g., instruction set 520 as discussed above at least with reference to FIG. 5) to be performed is determined. Further, an instruction ID corresponding to the one or more determined operations is identified. In step 840, a message is generated and sent using the cryptographic construct data. In certain aspects, an HMAC function generates a signature to be sent with the message. In step 850, a message is detected and validated in order to ensure the authenticity of the received message. In some embodiments, a message is validated using cryptographic data. In certain aspects, a secret key and an HMAC function may be used to validate the integrity of the received message. In step 860, one or more operations are identified and performed in response to the validated message. In certain embodiments, the identification of the one or more operations may include translation of instruction ID(s) to one or more appropriate operations.

Sample Secure Communication

In this example, it is assumed that the servers for Domains D1 and D2 share user and database context, but have unique Session IDs for their corresponding authenticated sessions with the same user or client.

1. User is authenticated to domains D1 and D2.
2. Client-side code is initialized and requests an Instruction Set.
3. Server D1 inspects user context to determine the user's privilege level.
4. Server D1 generates a new Instruction Set with a random Instruction Set ID. (IS-1)
4.a. This Instruction Set contains several random Instruction IDs, one for each of the operations approved for the user's privilege level.
4.b. Random Secret Key and necessary metadata for HMAC function is generated.
5. Server D1 passes IS-1 to Server D2 directly or through the shared database.
6. Servers D1 and D2 pass IS-1 to the Client Code in their corresponding windows.
7. The User has modified data in the window belonging to D1, and the window belonging to D2 is unaware of this change.
7.a. Client code in D1 looks up the Instruction ID for the Refresh Data operation.
7.b. Client code in D1 crafts the appropriate message and performs the HMAC function on the message.
8. Client code in D1 sends a message to D2 with Instruction ID, HMAC, timestamp, and other relevant meta data.
9. Client code in D2 detects the message from D1.
9.a. Client code validates the HMAC, timestamp, and other authentication and/or integrity protections.
9.b. Client code looks up the client operation for the Instruction ID in the message.
10. Client code performs the operation.

It should be appreciated that the systems and methods disclosed herein are not dependent upon any particular technology, protocol, or client/server application, and would work equally well in Javascript, Flash ActionScript, Java Applets, Adobe Air, etc.

Additionally, the systems and methods disclosed herein may be implemented in a variety of server architectures, such as 1) Multiple domains communicating with the same server(s), 2) Multiple domains with different servers that share user or database context, and 3) Multiple domains that do not share user or database context, but provide APIs for authorizing, generating, and exchanging instruction sets.

Instruction sets may be specific to user or application context and enforced based upon a variety of factors and/or conditions, such as user's permission level, application type, application version, domain, groups, organizations, etc.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
providing, from a client, authentication information of a user for a first domain and a second domain to a server;
receiving, by the client, a set of instructions and cryptographic construct data from the server, the set of instructions including information mapping one or more operations to at least one instruction ID;
identifying, by the client, a first instruction ID from the set of instructions corresponding to a first set of one or more operations that are permitted to be used in client-side communication between the first domain and the second domain;
generating, by the client, using one or more processors in one or more computer systems, a first message using the cryptographic construct data and including the first instruction ID; and
sending the first message to a recipient.

2. The method of claim 1, wherein the set of instructions includes information mapping each operation of the one or more operations to a unique instruction ID.

3. The method of claim 2, wherein each unique instruction ID is unique within the instruction set and with respect to other instruction sets received from a remote source providing the instruction set.

4. The method of claim 1, wherein each instruction ID includes a random value.

5. The method of claim 1, wherein each operation is not associated with the corresponding instruction ID except by the mapping in the set of instructions.

6. The method of claim 1, further comprising:
requesting the set of instructions from a server by a client, wherein the receiving of the set of instruction and the cryptographic construct data is performed by the client.

7. The method of claim 1, wherein the receiving of the set of instructions is by a client and the set of instructions is received from a source remote from the client.

8. The method of claim 7, wherein the receiving of the set of instructions is by a first browser frame provided by the client.

9. The method of claim 8, wherein the first browser frame has a secure connection with the first domain and does not have a secure connection with the second domain.

10. The method of claim 9, wherein the recipient is a second browser frame provided by the client.

11. The method of claim 8, wherein the second browser frame has a secure connection with the second domain and does not have a secure connection with the first domain.

12. The method of claim 1, wherein the at least one instruction ID of the set of instructions includes one or more instruction IDs associated with a time-to-live (TTL) that indicates when the one or more instructions will no longer be recognized by the recipient.

13. The method of claim 12, wherein the TTL of at least one of the instruction IDs that is mapped to one or more operations that are high-risk is substantially less than the TTL of at least one of the instruction IDs that is mapped to one or more operations that are low-risk.

14. The method of claim 1, wherein the at least one instruction ID of the set of instructions includes one or more instruction IDs associated with user privilege data indicating a privilege level required of the user in order for the one or more operations mapped to the one or more instruction IDs to be performed in response to a request by the user.

15. The method of claim 1, further comprising:
detecting a second message;
validating the second message using the cryptographic construct data;
identifying a second set of one or more operations corresponding to a second instruction ID determined from the second message; and
performing the second set of operations.

16. The method of claim 15, wherein:
the receiving of the set of instructions is by a first browser frame provided by a client,
the recipient is a second browser frame provided by the client
the sending the first message is by the first browser frame, and
the second message is produced by the second browser frame.

17. The method of claim 1, wherein the identifying the first instruction ID further comprises matching the first set of operations with the one or more operations mapped to the first instruction ID.

18. The method of claim 1, wherein the cryptographic construct data includes a secret key and an HMAC function.

19. The method of claim 15, wherein a first signature is generated by combining the first message with the secret key using the HMAC function and the first signature is sent to the recipient.

20. An apparatus comprising:
at least one processor;
a memory; and
at least one communications interface, wherein:
the at least one processor, the memory, and the at least one communications interface are communicatively connected with one another, and
the memory stores computer-executable instructions for controlling the at least one processor to:
obtain authentication information of a user for a first domain and a second domain;
receive, from a server, a set of instructions and cryptographic construct data via the at least one communications interface, the set of instructions including information mapping one or more operations to at least one instruction ID;
identify a first instruction ID from the set of instructions corresponding to a first set of one or more operations that are permitted to be used in client-side communication between the first domain and the second domain;
generate a first message using the cryptographic construct data and including the first instruction ID; and
send the first message to a recipient via the at least one communications interface.

21. A non-transitory, machine-readable medium storing computer-executable instructions for controlling at least one processor to:
provide, from a client, authentication information of a user for a first domain and a second domain to a server;
receive, by the client, a set of instructions and cryptographic construct data via at least one communications interface, the set of instructions including information mapping one or more operations to at least one instruction ID;
identify, by the client, a first instruction ID from the set of instructions corresponding to a first set of one or more operations that are permitted to be used in client-side communication between the first domain and the second domain;
generate, by the client, a first message using the cryptographic construct data and including the first instruction ID; and
send the first message to a recipient via the at least one communications interface.

* * * * *